No. 798,495. PATENTED AUG. 29, 1905.
H. M. BUTLER.
ELASTICALLY CONTROLLED WHEEL HUB.
APPLICATION FILED MAY 12, 1905.
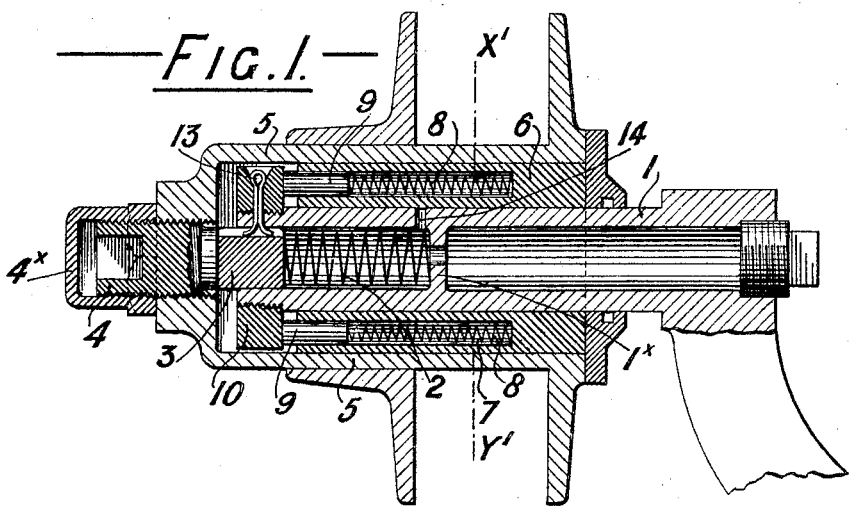
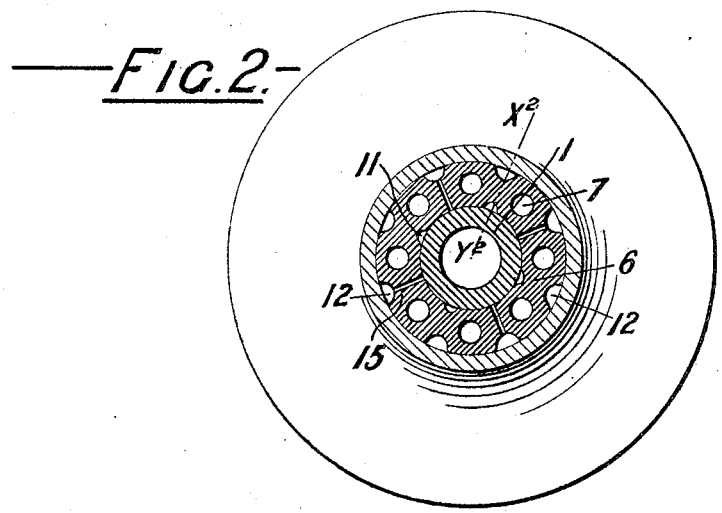
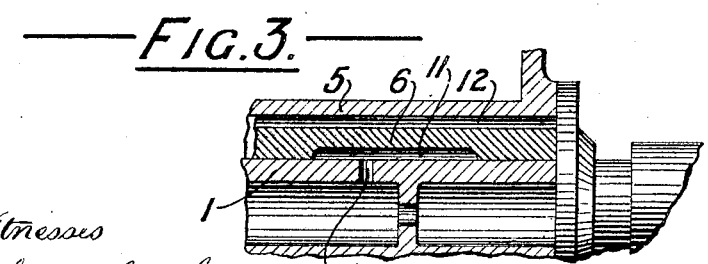
Witnesses
Chas. H. Smith
Bertha M. Allen
Inventor
Hugh Myddleton Butler
per Harold Serrell
Atty

UNITED STATES PATENT OFFICE.

HUGH MYDDLETON BUTLER, OF KIRKSTALL FORGE, NEAR LEEDS, ENGLAND.

ELASTICALLY-CONTROLLED WHEEL-HUB.

No. 798,495.　　　Specification of Letters Patent.　　　Patented Aug. 29, 1905.

Application filed May 12, 1905. Serial No. 260,096.

*To all whom it may concern:*

Be it known that I, HUGH MYDDLETON BUTLER, a subject of the King of Great Britain, residing at Kirkstall Forge, near Leeds, Yorkshire, England, have invented certain new and useful Improvements in Elastically-Controlled Wheel-Hubs, of which the following is a specification.

In wheel-hubs which are free to have elastically-controlled longitudinal sliding motions upon their axle-barrels in either direction from a normal position helical springs have been placed externally around the axle-barrel, and one such spring has acted against the outer end of the hub and against the collar on the barrel, while the other spring has acted against the inner end of the hub and also against the said collar on the barrel. If, however, such springs are to be of practical service, it is necessary that space should be provided for springs of sufficient length, while at the same time it is disadvantageous to greatly increase the length of the hub and axle-barrel, and I have therefore in the specification of a prior application for United States patent, Serial No. 232,404, described an elastically-controlled hub, which carries two oppositely-acting sets of helical springs, each set containing a number of helical springs arranged in ways or bores formed in the hub or in bushes fixed thereto, and one set of such springs acts collectively upon one side of an abutment-collar fixed on the barrel, while the other set of springs acts collectively upon the other side of the same abutment-collar, and I have also further shown means by which the tension of these two sets of springs can be simultaneously adjusted.

Now according to my present invention I provide a construction and combination of parts, as hereinafter described and claimed, by which the length of the hub and axle-barrel can be still further decreased, while at the same time amply sufficient space is provided for containing springs such as are capable of exerting the required amount of elastic resistance, the hub being fitted also with means whereby the tension of the said oppositely-acting springs can be simultaneously adjusted. To this end I make the axle-barrel tubular or tubular at its outer end, so as to contain one elastic medium for pressing the wheel-hub laterally in one direction, while the other elastic medium for pressing the wheel-hub in the other direction (and which latter medium may consist of a set of springs) is located between the exterior surface of the axle-barrel and the wheel-hub, both elastic media being included within the length of the hub.

The invention is described with reference to the accompanying drawings, whereon—

Figure 1 shows the elastically-balanced hub in longitudinal section, Fig. 2 being a transverse section on the line $X'Y'$ of Fig. 1 and Fig. 3 a longitudinal section on the line $X^2 Y^2$ of Fig. 2.

Referring to Figs. 1 and 2, the axle-barrel 1 is of tubular formation to contain a helical spring 2, which acts against a stationary diaphragm $1^x$, formed or fixed within the bore of the barrel 1, and against a loose plunger 3, which enters or partially enters the open end of the said bore of the barrel. Obviously the barrel need only be tubular at its outer end for a sufficient depth to contain the spring 2. The plunger 3, which is capable of motion in the direction of the axis of the barrel, is forced by the spring against an adjustable bolt 4, screw-threaded into the end of the hub 5 and fitted with a lock-nut $4^x$, which in the design shown forms an end cap. The bolt 4 is made of larger diameter preferably than the plunger 3, so that the said plunger 3 can be drawn out from the bolt-hole in the hub, and also the spring 2 be removed, if so desired, and a new spring substituted without necessitating the removal of the hub off the axle-barrel. The wheel-hub 5 has fixed within it a bearing-bush 6, and formed in the outer end of the bush there are a number of holes 7, which extend parallel with the axis of the hub. In each hole 7 a spring 8 is located bearing against the closed end of the hole 7 on the outer end of the bush and acting at its other end against a plunger 9, which is free to be slid in the hole. This plunger 9 bears up against the collar 10, which is securely fixed to the outer end of the hollow barrel 1. In the construction shown the collar 10 is screw-threaded onto the end of the axle-barrel 1, and it is there secured in position by a split pin 13, which passes through the collar 10 and through the end of the hollow axle-barrel, the ends of the split pin 13 being opened outward, so as to enter a longitudinal groove formed in the plunger 3, whereby this otherwise loose plunger is prevented from revolving with the hub.

Such a hub as described for the purposes of lubrication is shown formed with a hole 14 from the hollow of the barrel 1, through which the lubricant can pass to the grooves 11, Fig. 3, on the interior of the sleeve 6, which latter, it will be remembered, is fixed to the hub, and thus the lubricant spreads between the surface of the barrel 1 and the sleeve 6. The grooves 12 on the outer surface of the sleeve 6, (see Figs. 2 and 3,) which extend entirely across the same, serve as channels through which the lubricant is forced from the outer end of the hub as it slides, and from these channels the oil is conducted by small perforations 15 to the bearing-surface.

The construction of the hub with a series of longitudinal ways or bores to contain a set of helical springs to press the hub in one direction is an advantageous construction and is described in my patent application, Serial No. 232,404, before referred to; but an important feature in the present invention is the arrangement of one of the springs in the interior of the tubular or partially-tubular barrel, while the oppositely-acting set of springs is located externally of the barrel and acts between the inner end of the hub and the collar fixed on the barrel, and the invention also presents a convenient means for adjusting simultaneously the tension of both of the oppositely-acting elastic media by the adjustment of the bolt 4, carried by the hub acting upon the plunger 3.

What I claim as my invention, and desire to secure by Letters Patent, is—

1. In a wheel-hub free to have elastically-controlled longitudinal sliding motions upon its axle-barrel in either direction from a normal position, the combination with a hollow axle-barrel; a wheel-hub revolubly mounted thereon, springs carried in the hub, and an abutment-collar fixed on the barrel against which the springs carried by the hub act to press the hub in one direction; of a spring in the bore of the barrel, an abutment in the said bore against which the inner end of the barrel-spring bears, and a sliding plunger located in the outer end of the bore of the barrel to bear against the spring and against the outer end of the hub to press the hub in the other direction, substantially as set forth.

2. In a wheel-hub free to have elastically-controlled longitudinal sliding motions upon its axle-barrel in either direction from a normal position, the combination with a hollow axle-barrel, a wheel-hub revolubly mounted thereon, springs carried in the hub, and an abutment-collar fixed on the barrel against which the springs carried by the hub act to press the hub in one direction; of a spring in the bore of the barrel, an abutment in the said bore against which the inner end of the barrel-spring bears, a sliding plunger located in the outer end of the bore of the barrel to bear at one end against the spring, an abutment in the outer end of the hub to receive the pressure of the outer end of the plunger, and means for longitudinally adjusting the abutment at the outer end of the hub to simultaneously adjust the tension of the oppositely-acting springs, substantially as set forth.

3. In a wheel-hub free to have elastically-controlled longitudinal sliding motions upon its axle-barrel in either direction from a normal position; the combination with a hollow axle-barrel, a wheel-hub revolubly mounted thereon, springs carried in the hub, and an abutment-collar fixed on the barrel against which the springs carried by the hub act to press the hub in one direction; of a spring in the bore of the barrel, an abutment in the said bore against which the inner end of the spring acts, a sliding plunger in the end of the bore of the barrel against which the outer end of the spring acts, an abutment-bolt screw-threaded into the outer end of the hub against which the outer end of the plunger bears to press the hub in the other direction and means for longitudinally adjusting the abutment-bolt to simultaneously adjust the tension of the oppositely-acting springs, substantially as set forth.

4. In a wheel-hub free to have elastically-controlled longitudinal sliding motions upon its axle-barrel in either direction from a normal position; the combination with an axle-barrel having a tubular bore at its outer end, a helical spring in compression located in said bore, an abutment at the inner end of said bore for one end of the spring, a sliding plunger in the outer end of said bore, against which the outer end of the said spring acts, and means for preventing the rotation of the plunger in the bore; of a wheel-hub mounted on the axle-barrel against the outer end of which hub the plunger is pressed by the spring in the bore of the barrel, a stationary collar fixed externally upon the axle-barrel, and a series of helical springs carried by the wheel-hub to act against the abutment-collar on the barrel to press the wheel-hub in the other direction, substantially as set forth.

5. In a wheel-hub free to have elastically-controlled longitudinal sliding motions upon its axle-barrel in either direction from a normal position; the combination with an axle-barrel having a tubular bore at its outer end, a helical spring in compression located in said bore, an abutment at the inner end of said bore for one end of the spring, and a sliding plunger in the outer end of said bore against which the outer end of said spring acts; of a wheel-hub mounted on the axle-barrel against the outer end of which hub the plunger is pressed by the spring in the bore of the barrel, a stationary annular abutment-collar fixed externally near the outer end of the axle-barrel, a bearing-bush having longitudinal ways fixed within the wheel-hub and bearing on the periphery of the barrel, helical springs located in the borings of the bush and bearing against the closed ends of said borings distant from the abutment-collar, and plungers in the outer ends of the borings of said bush to act against the springs and to bear against the inner face of the abutment-collar, substantially as set forth.

6. In a wheel-hub free to have elastically-controlled longitudinal sliding motions upon its axle-barrel in either direction from a normal position; the combination with an axle-barrel having a tubular bore at its outer end, a helical spring in compression located in the said bore, an abutment at the inner end of said bore for one end of the spring, and a sliding plunger in the outer end of said bore against which the outer end of said spring acts; of a wheel-hub mounted on the axle-barrel, a longitudinal adjustable abutment-bolt screw-threaded into the outer end of the hub against the end of which bolt the plunger is pressed by the spring in the bore of the barrel, a stationary annular abutment-collar fixed externally near the outer end of the axle-barrel, a bearing-bush having longitudinal borings fixed within the wheel-hub and bearing on the periphery of the barrel, helical springs located in the borings of the bush and bearing against the closed ends of said borings distant from the abutment-collar, and plungers in the outer ends of the borings of said bush to act against the springs and to bear against the inner face of the abutment-collar, substantially as set forth.

In witness whereof I have hereunto set my hand in the presence of two witnesses.

HUGH MYDDLETON BUTLER.

Witnesses:
JOHN JOWETT,
VANCE E. GALLOWAY.